Nov. 30, 1948.  J. I. GARSIDE  2,455,004
GRINDING MACHINE
Filed Sept. 7, 1945  4 Sheets-Sheet 1
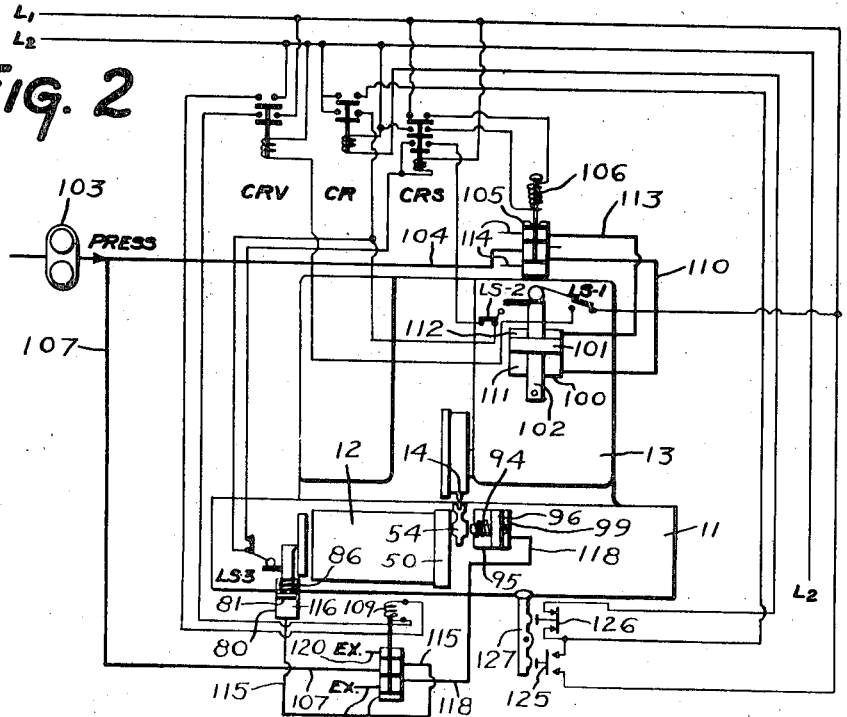
Inventor
JOHN I. GARSIDE
By Harold W. Eaton
Attorney Nov. 30, 1948.  J. I. GARSIDE  2,455,004
GRINDING MACHINE
Filed Sept. 7, 1945  4 Sheets-Sheet 2
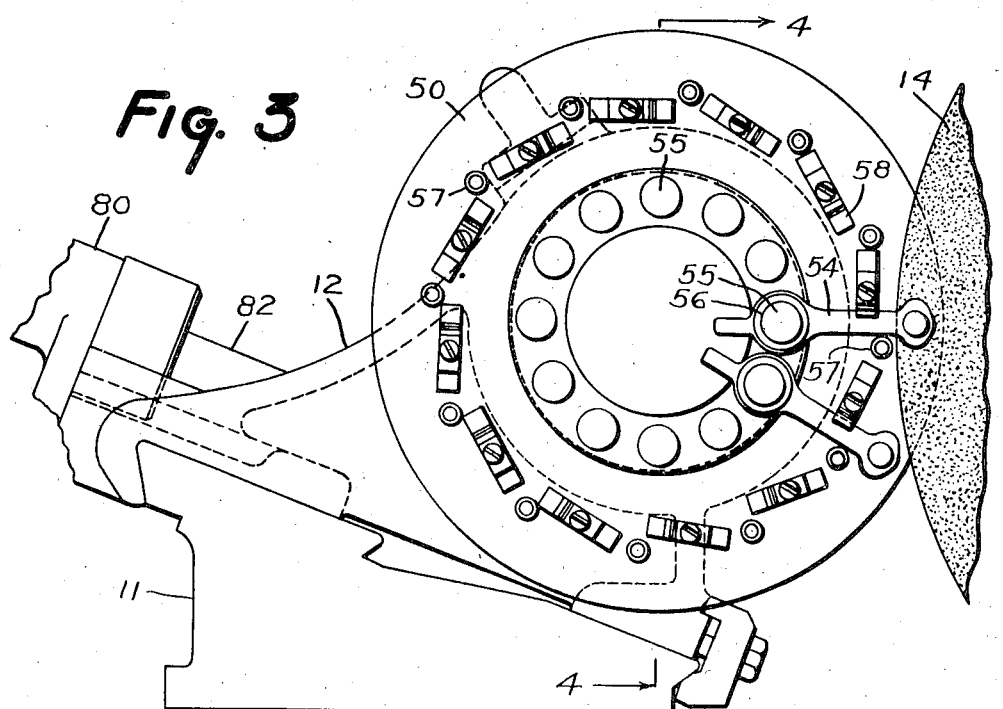
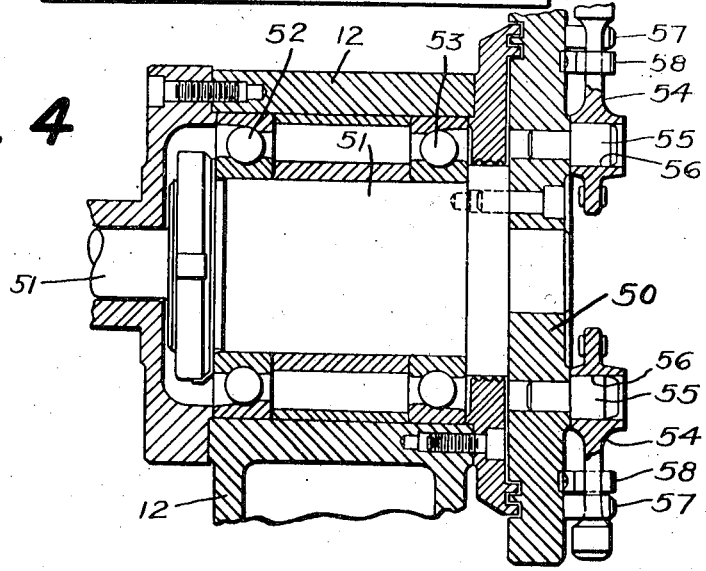
JOHN I. GARSIDE Inventor
By Harold W. Eaton
Attorney

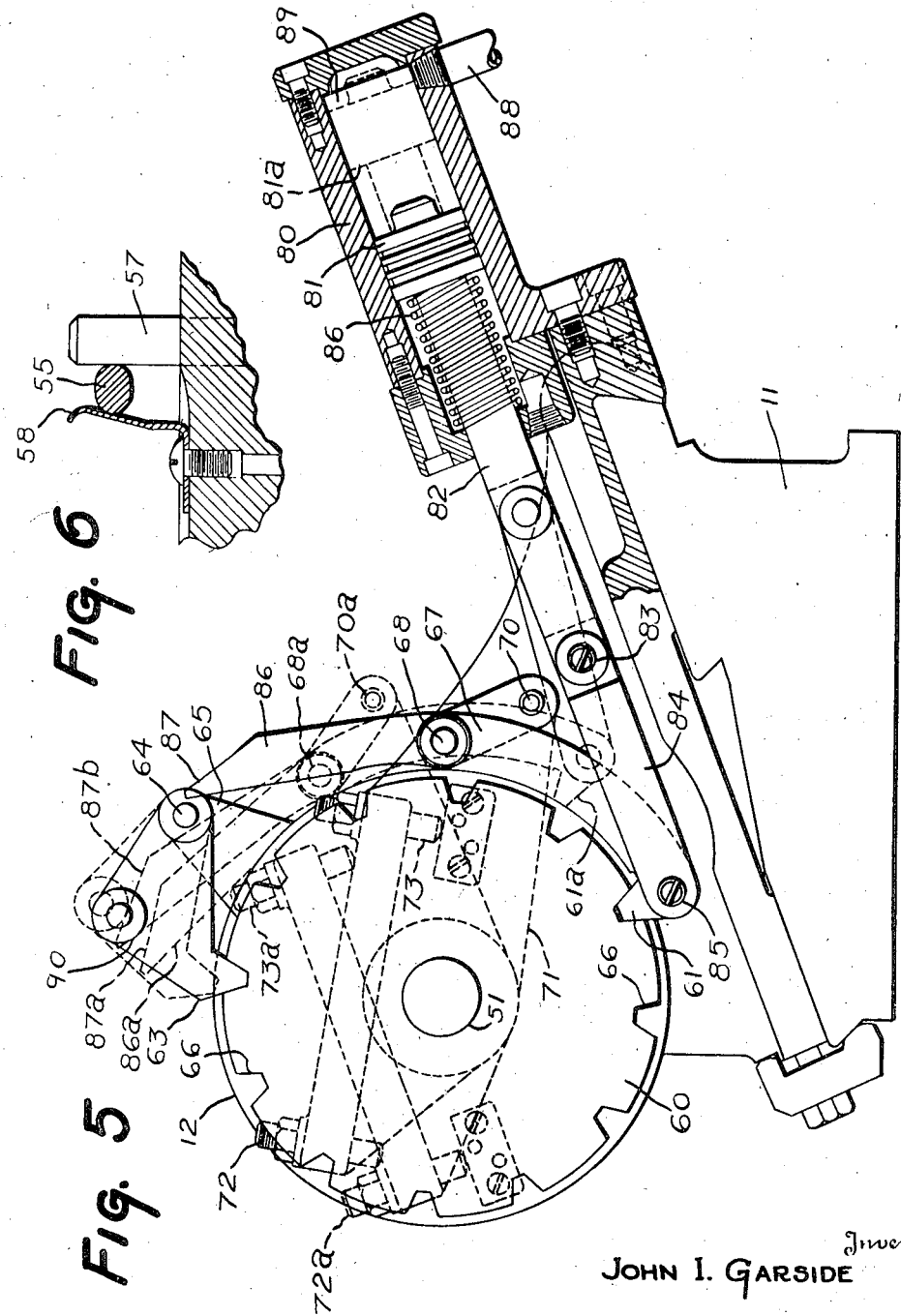

Nov. 30, 1948.  J. I. GARSIDE  2,455,004
GRINDING MACHINE
Filed Sept. 7, 1945  4 Sheets-Sheet 4
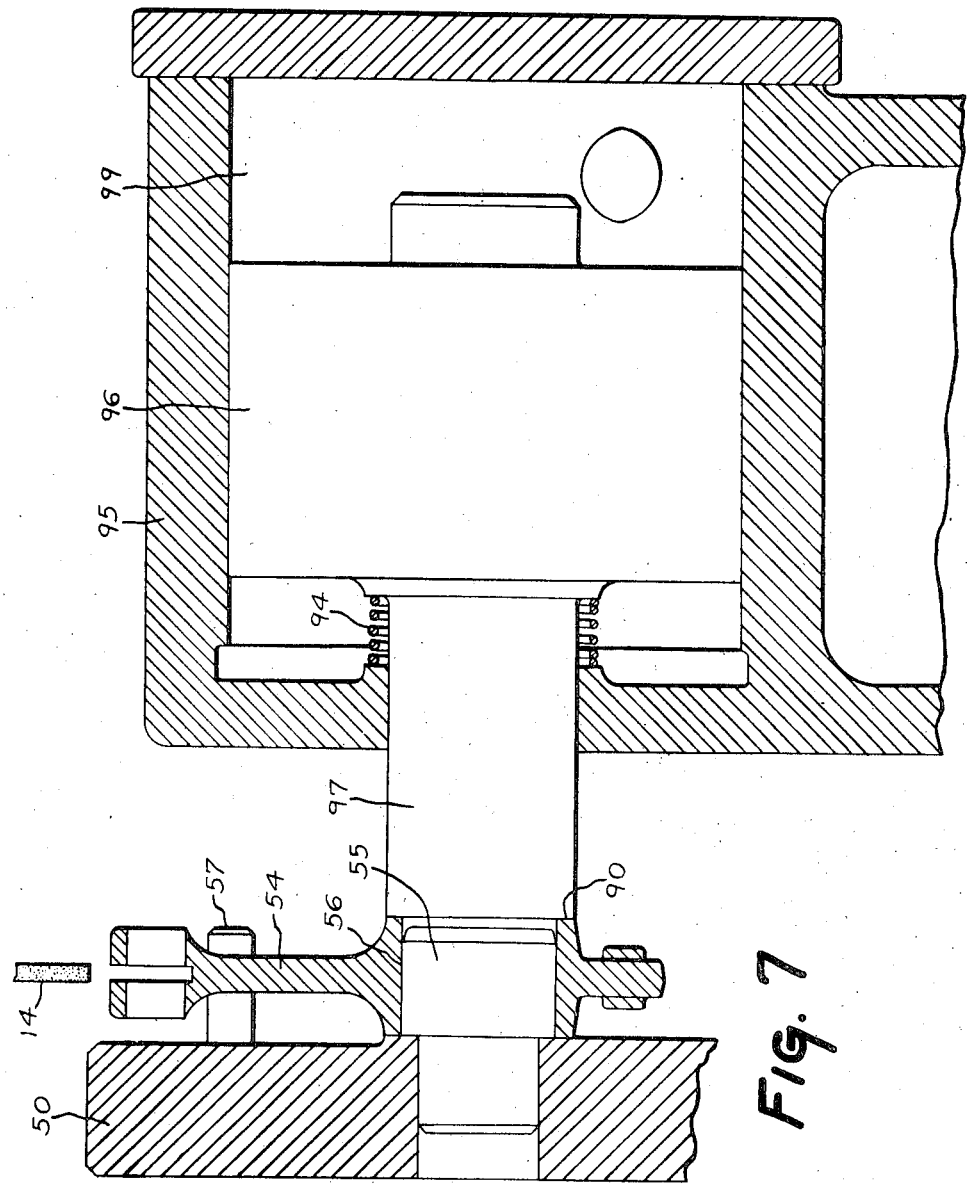
INVENTOR
JOHN I. GARSIDE
By Harold W. Eaton
Attorney Patented Nov. 30, 1948

2,455,004

UNITED STATES PATENT OFFICE 2,455,004

GRINDING MACHINE

John I. Garside, West Boylston, Mass., assignor to Norton Company, Worcester, Mass., a corporation of Massachusetts Application September 7, 1945, Serial No. 614,912

13 Claims. (Cl. 51—108)

The invention relates to grinding machines, and more particularly to a machine for automatically and successively grinding a plurality of work pieces.

One object of the invention is to provide a simple and thoroughly practical hydraulically operated, electrically controlled automatic grinding machine for automatically grinding a plurality of work pieces. Another object of the invention is to provide an automatic grinding machine in which work pieces are loaded on a work turret and successively fed into an operative position and ground to the desired and predetermined extent. Another object of the invention is to provide an automatic grinding machine for grinding a predetermined surface on the end of a work piece. Another object of the invention is to provide an automatic grinding machine for successively grinding predetermined slots in the end of connecting rods and the like. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a front elevation of the improved automatic grinding machine;

Fig. 2 is a combined hydraulic piping diagram and electrical wiring diagram of the control mechanisms of the machine;

Fig. 3 is a fragmentary right-hand end elevation, on an enlarged scale, of the work loading turret;

Fig. 4 is a fragmentary vertical sectional view, taken approximately on the line 4—4 of Fig. 3, of the rotatable support for the work loading turret;

Fig. 5 is a left-hand end elevation, on an enlarged scale, partly in section, of the work turret indexing mechanism;

Fig. 6 is a fragmentary sectional view, on an enlarged scale, of one of the spring clips and pins for locating and holding a work piece on the work loading turret; and Fig. 7 is a fragmentary sectional view, on an enlarged scale, through the hydraulic mechanism for clamping a work piece when in an operative position on the work loading turret.

A grinding machine has been illustrated in the drawings comprising a base 10 which supports a longitudinally movable work supporting table 11 on the usual V-way and flat way (not shown). The table 11 serves as a support for a work loading and supporting mechanism 12 to be hereinafter described.

A transversely movable wheel slide 13 is arranged to slide transversely relative to the base 10 on the usual V-way and flat way (not shown). The wheel slide 13 supports a rotatable grinding wheel 14 at one end of a wheel spindle (not shown). The wheel 14 is preferably driven by an electric motor 15 mounted on the upper surface of the wheel slide 13. The motor is provided with an armature shaft 16 having a driving pulley 17 mounted thereon. The driving pulley 17 is connected by a driving belt 18 with a pulley 19 mounted on the right-hand end of the wheel spindle.

In order to facilitate positioning the table 11 so as to position the work pieces to be ground relative to the grinding wheel 14, a suitable manually operable traverse mechanism is provided comprising a manually operable traverse wheel 20. The traverse wheel 20 is rotatably mounted on a shaft 22 which is connected by means of a gear (not shown) with a gear 22 which is mounted on a shaft 23. The shaft 23 also supports a gear 24 which meshes with a rack bar 25 depending from the under side of the table 11. It will be readily apparent from the foregoing disclosure that a rotary motion of the hand wheel 20 will be transmitted through the mechanism above described to move the table 11 longitudinally in either direction. The direction of movement of the table 11 depends upon the direction of rotation of the hand wheel 20.

A suitable feeding mechanism is provided for manually adjusting the position of the wheel slide 13 and grinding wheel 14 comprising an old and well known feed wheel 26 having a micrometer adjusting mechanism 27. The feed wheel 26 is operatively connected to rotate a gear 28 which is mounted on the end of the feed screw shaft 29. The feed screw shaft 29 is operatively connected to rotate a feed screw (not shown) which meshes with a half nut (not shown) depending from the under side of the wheel slide 11. This feed mechanism is substantially the same as that shown in the prior U. S. Patent to Carl G. Flygare et al., No. 2,349,786, dated May 23, 1944, to which reference may be had for details of disclosure not illustrated and contained herein.

In order to facilitate a power traverse or reciprocation of the table 11 for a traverse grinding operation, a hydraulically operated mechanism is provided comprising a cylinder 30 which is fixedly supported on the under side of the table 11. The cylinder 30 contains a pair of spaced pistons (not shown) which are connected by hollow piston rods 33 and 34 respectively with hollow end brackets 35 and 36 respectively which are mounted on opposite ends of the base 10. This hydraulic table drive mechanism is substantially the same as that shown in the prior U. S. Patent to Wallace H. Wood, No. 2,071,677, dated February 23, 1937, to which reference may be had for details of disclosure not contained herein.

A pair of pipes 37 and 38 connect the brackets 35 and 36 respectively with a control valve unit 39. The control valve unit 39 comprises a reversing valve for controlling the direction of flow of fluid to and from the cylinder 30 and also contains a combined start and stop valve and speed control valve for regulating the exhaust of fluid from the cylinder 30 so as to control the speed of movement of the table 11. The control valve unit 39 is identical with that disclosed in prior U. S. patent to W. H. Wood above referred to.

A hydraulic system is provided for supplying fluid under pressure to reciprocate the table 11 comprising a fluid reservoir 40 formed within the base 10. A motor driven fluid pressure pump 41 draws fluid through a pipe 42 from the reservoir 40 and passes fluid under pressure through a pipe 43 to the control valve 39. An adjustable relief valve 44 is connected in the pipe line 43 by means of which excess fluid under pressure may be returned directly to the reservoir 40, thus facilitating maintaining a predetermined operating pressure within the hydraulic system.

A manually operable start and stop lever 45 is provided for actuating the stop and start valve so as to start and stop the movement of the table 11 as desired. A pivotally mounted reversing lever 46 is mounted on the front of the machine base and is operatively connected to actuate the table reversing valve in timed relation with the reciprocatory movement of the table 11. A pair of adjustable table dogs 47 and 48 are adjustably supported in a T-slot 49 formed in the front edge of the table 11. It will be readily apparent that the positioning of the dogs 47 and 48 determines the length of the reciprocatory stroke of the table 11. This table traversing and reciprocating mechanism is identical with that shown in the above referred to prior patent to Wood, to which reference may be had for details of disclosure not contained herein.

In order to support a plurality of work pieces so that they may be intermittently and successively positioned for a grinding operation, the work support 12 is provided with a rotatable work loading turret 50 (Figs. 1, 3 and 4). The work turret 50 is mounted on one end of a rotatable shaft 51 which is journalled in anti-friction bearings 52 and 53 supported within the work supporting head 12. As illustrated in the drawings, the machine as set up is particularly adapted for grinding a predetermined slot in the end of a connecting rod. To facilitate locating a plurality of work pieces 54 on the turret 50, a plurality of locating pins 55 are fixedly mounted on the work loading turret 50. These locating pins 55 are of a predetermined diameter to mate with a finished hole 56 formed in the ends of the connecting rod 54. A plurality of locating studs 57 are provided on the work loading turret 30 which cooperate with a plurality of spring clips 58. It will be readily apparent from the foregoing disclosure that a connecting rod 54 may be slid manually into an operative position with the hole 56 of the connecting rod 54 mating with one of the studs 55 on the work turret 50 and the main part of the connecting rod being held against one of the pins 57 by means of one of the spring clips 58.

The work loading turret 50 is preferably arranged so that it may be automatically indexed successively to present work pieces into a grinding relationship with the grinding wheel 14. This mechanism preferably comprises an automatically actuated indexing mechanism comprising an index plate 60 which is fixedly mounted on a reduced left-hand end portion of the turret shaft 51. An actuating pawl 61 is provided for intermittently indexing the plate 60 to index the turret wheel 50 as desired.

A holding pawl 63 is pivotally supported on a stud 64 which is in turn supported on a bracket 65 which is formed integral with or fixedly mounted on the head 12. The holding pawl 63 is provided with a shaped end which is arranged to mate under the influence of gravity with one of a plurality of notches 66 formed in the periphery of the index plate 60.

The indexing pawl 61 is supported at one end of a pivotally mounted arm 67. The arm 67 is pivoted on a stud 68 which is carried by a rock plate 71. The rocking member 71 is pivotally supported on the reduced cylindrical portion of the shaft 51. A stop pin 70 is provided on the plate 71 to limit the swinging movement of the pawl arm 67 in a counterclockwise direction (Fig. 5). A pair of adjustably mounted stop screws 72 and 73 are provided to limit the rocking movement of the member 71 in either direction.

In order that the index pawl 61 may be automatically actuated in timed relation with the other mechanisms of the machine, a hydraulically operated mechanism is provided comprising a fluid pressure cylinder 80 which contains a slidably mounted piston 81. The piston 81 is fixedly connected to one end of a piston rod 82. The piston rod 82 is connected by means of a pivot stud 83 with a pivotally mounted arm 84 which is in turn connected by a stud 85 with the pawl carrying arm 67. A compression spring 86 surrounds the piston rod 82 and is interposed between the cylinder head at the left-hand end of the cylinder 80 and the piston 81 (Fig. 5). The compression of the spring 86 serves to move the piston 81 toward the right (Fig. 5) which serves to move the pawl arm 67 in a counterclockwise direction to withdraw the index pawl 61 from the notch 66 until arm 67 engages stop pin 70 after which plate 71 is rocked in a counterclockwise direction (Fig. 5) through an idle stroke into dotted line position.

The index pawl arm 67 is provided with an upwardly extending arm 86 having a cam face 87 formed adjacent to its upper end. When the index pawl 61 is moved through an idle or inoperative stroke, the arm 86 moves upwardly into dotted line position 86a with the cam face 87 in position 87a.

When it is desired to effect an indexing movement of the work turret 50, fluid under pressure is admitted through a pipe 88 into a cylinder chamber 89 formed at the right-hand end of the cylinder 80 to cause the piston 81 to move from the dotted line position 81a (Fig. 5) into full line position. During the initial part of the piston stroke, the index pawl arm 67 will be rocked in a clockwise direction on the pivot stud 68 so that the index pawl 61 will engage the next notch 66 on the index plate 60. At the same time, the arm 86 is rocked in a clockwise direction so that the cam face 87 moves from position 87a into position 87b. During this movement of the cam 87, the cam face engages a hub portion 90 formed on the holding pawl member 63 and rocks the holding pawl 63 in a clockwise direction out of engagement with the notch 66, after which continued movement of the piston 81 toward the left turns the index plate 60 in a clockwise direction (Fig. 5) to index the next work piece 54 into an operative grinding position. The holding pawl 63 then drops into the next notch 66 to locate the work loading turret 50 with the next work piece 54 in an operative position for grinding a predetermined slot 91 in the end portion thereof.

A suitable clamping mechanism is provided to hold a work piece 54 rigidly in position on the work loading turret during a grinding operation. This mechanism may comprise a hydraulic cylinder 95 having a piston 96 slidably mounted therein. A piston rod 97 is fixedly connected at one end to a piston 96. The other end of the piston rod 97 is arranged to engage a hub portion 56 of the work piece 54 when fluid under pressure is admitted through a pipe 118 into a cylinder chamber 99 rigidly to clamp the work piece 54 on the work loading turret 50. A compression spring 94 surrounds the piston rod 97 and is interposed between the piston 96 and the cylinder head enclosing the left-hand end of the cylinder 95. The released compression of the spring 94 serves to move the piston 96 toward the right (Fig. 7) when fluid is allowed to exhaust from the chamber 99 to unclamp a work piece 54.

A hydraulically operated wheel feeding mechanism is provided rapidly to move the grinding wheel 14 into operative engagement with the work piece 54 to be ground and then slower to grind the work piece 54 to the desired and predetermined extent. This mechanism may comprise a hydraulic cylinder 100 which is fixedly mounted relative to the base 10 of the machine. The cylinder 100 contains a slidably mounted piston 101 which is fixedly connected to a double end piston rod 102. The piston rod 102 is preferably arranged in axial alignment with the feed screw (not shown). This feeding mechanism is substantially the same as that shown in the prior U. S. Patent No. 2,349,786, to Carl G. Flygare et al., dated May 23, 1944, to which reference may be had for details of disclosure not contained herein. In addition to the cylinder 100 and piston 101, this mechanism may, if desired, also include a dash pot feed regulator such as that disclosed in the prior patent above referred to. This mechanism is not considered a part of the present invention and consequently has not been illustrated in detail.

A fluid pressure system if provided for supplying fluid under pressure to the cylinders 80, 95 and 100. This fluid system may comprise a motor driven fluid pump 103 (Fig. 2) which is arranged to supply fluid under pressure through a pipe 104 to a control valve 105 which controls the admission to and exhaust of fluid from the feed cylinder 100. The control valve 105 is preferably electrically controlled by means of a solenoid 106. The pump 103 also forces fluid under pressure through a pipe 107 to a control valve 108. The control valve 108 is arranged to control the admission to and exhaust of fluid from the cylinders 80 and 95. The control valve 108 is preferably electrically controlled by means of an electric solenoid 109.

In the position of the control valve 105, fluid under pressure in the pipe 104 passes through a pipe 110 into a cylinder chamber 111 to move the piston 101 (upwardly as shown in Fig. 2) so as to move the grinding wheel 14 and the wheel slide 13 each rearwardly into an inoperative position. During this movement, fluid within a cylinder chamber 112 exhausts through a pipe 113, through the valve 105 and out through an exhaust pipe 114 into the reservoir 40. When the solenoid 106 is energized the control valve 105 is shifted into a reverse position so that fluid under pressure from the pipe 104 passes through a pipe 113 into a cylinder chamber 112 to cause a forward movement of the piston 101, the wheel slide 13 and the grinding wheel 14 to grind the work piece 54 to the desired and predetermined extent. During the forward feeding movement of the piston 101, fluid within the cylinder chamber 111 exhausts through the pipe 110 through the valve 105 and out through an exhaust pipe 114 into the reservoir 40.

In the position of the valve 108, as shown in Fig. 2, fluid under pressure passing through the pipe 107 passes through the valve 108, through a pipe 115 into a cylinder chamber 116 in the cylinder 80 to move the piston 81 so as to impart an indexing movement to the index pawl 61.

In this position of the valve 108, fluid in a cylinder chamber 117 in the cylinder 95 may exhaust through a pipe 118, through the control valve 108 and through an exhaust pipe 119 into the reservoir 40. When the solenoid 109 is energized, the valve 108 is shifted into a reverse position so that fluid under pressure in the pipe 107 will pass through the valve 108, through the pipe 118 into the cylinder chamber 99 to move the piston 96 toward the left (Fig. 2) so as to clamp the work piece 54 in an operative grinding position on the work loading turret 50 during the next grinding operation. With the valve in this position, the released compression of the spring 86 moves the piston 81 so as to exhaust fluid from the cylinder chamber 116 through the pipe 115, through the valve 108 and out through an exhaust pipe 120 into the reservoir 40. This latter movement of the piston 81 serves to move the index pawl 61 through an idle stroke so that it is ready for the next indexing operation.

In order to obtain one of the main objects of this invention, it is desirable to provide an automatic control mechanism whereby successive work pieces 54 may be automatically ground to the desired and predetermined extent without stopping the machine. To facilitate provisions of an automatic control cycle, an electrical control system is provided for controlling the solenoid actuated valves 105 and 108. This electrical control mechanism may comprise a start switch 125 and a stop switch 126 which are arranged to be actuated by a manually operable control lever 127. The control lever 127 is pivotally supported on the front of the machine base 10. This electrical control apparatus has been illustrated diagrammatically in Fig. 2 including power lines L1 and L2 which supply the source of electrical power for operating the machine. Electrically operated relay switches CR, CRS and CRV are provided for controlling the cycle of operation. A normally closed limit switch LS1 is held open when the piston rod 102 is in a rearward position. A normally closed limit switch LS2 is arranged to be opened during the forward or infeeding movement of the grinding wheel. A normally open limit switch LS3 is arranged to be closed by the piston rod 82 when it is moved toward the left (Fig. 5) to index the work loading turret 50. To start a grinding cycle, it is merely necessary to manually shift the control lever 127 in a counterclockwise direction (Fig. 2) to close the starter switch 125. The closing of the starter switch 125 starts an automatic grinding cycle to grind the first work piece 54 to the desired and predetermined extent after which the cycle repeats itself until stopped by the operator. In order to interrupt the automatic grinding cycle, the control lever 127 may be at any time moved in a clockwise direction (Fig. 2) to open the normally closed stop switch 126 which is arranged to break a circuit and immediately terminate the grinding cycle and return the grinding wheel 14 and the wheel slide 13 to a rearward or inoperative position.

The operation of this improved grinding machine will be readily apparent from the foregoing disclosure. Assuming all adjustments to have been previously made, when it is desired to start a grinding operation a plurality of work pieces 54 are manually loaded on to a work loading turret 50 in a manner above described. The cycle control lever 127 is then rocked in a counterclockwise direction (Fig. 2) to close the cycle start switch 125. Closing of the switch 125 serves to energize the relay switch CR which closes a circuit to energize the relay switch CRS. The energizing of relay switch CRS closes a circuit to energize the solenoid 106 to shift the feed control valve 105 into a reverse position so that fluid under pressure will be passed from the pipe 104, through the pipe 113 into the cylinder chamber 112, to start a forward feeding movement of the wheel slide 13 and the grinding wheel 14. During the initial forward movement of the piston 101, the limit switch LS1 is closed which closes a circuit to energize the relay switch CRV. Energizing of the relay switch CRV serves to close a circuit to energize the solenoid 109 and thereby to shift the valve 108 so as to admit fluid under pressure through the pipe 118 into the cylinder chamber 99 so as to clamp a work piece 54 in an operative grinding position on the work loading turret 50. The shifting of the valve 108 into this position serves to allow fluid to exhaust from the cylinder chamber 116, through the pipe 115, through the valve 108, and out through the exhaust pipe 120 into the reservoir 40. The exhausting of fluid from the cylinder chamber 116, as facilitated by the release compression of a spring 85, returns the piston 81 into position 81a (Fig. 5). This movement of the piston 81 serves to withdraw the index pawl 61 through an idle stroke during which the limit switch LS3 opens. During the idle stroke of the indexing pawl 61, the index plate 60 is held against rotary motion by means of the holding pawl 63.

The forward feeding movement of the grinding wheel 14 continues to grind a slot of a predetermined width to a predetermined depth in an end of a work piece 54. When the grinding wheel 14 has reached the desired forward position and the work has been ground to the desired predetermined extent, the limit switch LS2 opens to open a circuit thereby de-energizing the relay switch CRS which in turn de-energizes the solenoid 106 and allows the valve 105 to shift into the position illustrated in Fig. 2. In this position of the valve 105 fluid under pressure is passed from the pipe 104, through the valve 105, through the pipe 110 into the cylinder chamber 111 to move the piston 101 together with the grinding wheel 14 and the wheel slide 13 rearwardly to an inoperative position. When the grinding wheel 14 approaches its rearward or inoperative position the limit switch LS1 opens to de-energize the relay switch CRV so as to de-energize the solenoid 109 and thereby to shift the valve 108 into the position illustrated in Fig. 2. In this position of the valve 108, fluid is exhausted from the cylinder chamber 99 of the work clamp cylinder 95, under the influence of the released compression of the spring 94, through the pipe 118, through the valve 108 and out through the exhaust pipe 119 into the reservoir 40. The released compression of the spring 94 moves the piston 96 toward the right (Figs. 2 and 7) to unclamp the work piece 54. At the same time the valve 108 is shifted into the position illustrated in Fig. 2, fluid under pressure from the pipe 107 is passed through the valve 108, through the pipe 115 into the cylinder chamber 116 to move the piston 81 to shift the index pawl 61 through the operative indexing stroke. The index pawl 61 rocks into engagement with the next notch 66 in the index plate 60 and then turns the index plate 60 so as to index the work loading turret 50 to shift the next work piece 54 into an operative grinding position ready for the next grinding operation. At the same time the turret 50 indexes, the ground piece of work 54 is shifted out of a grinding position so that it may be readily unloaded manually by the operator.

The indexing movement of the piston 81 serves to close the limit switch LS3. The limit switch LS2 has previously been closed by movement of the grinding wheel 14 to an inoperative position so that the closing of the limit switch LS3 serves to energize the relay switch CRS to thereby start the next grinding cycle. This cycle of operation will continue indefinitely to repeat itself until interrupted by manual movement of the control lever 27. If at any time during a grinding cycle it is necessary and desirable to interrupt and stop the grinding operation, the control lever 127 may be rocked in a clockwise direction (Fig. 2) to open the stop switch 126, thereby breaking a circuit to de-energize the relay switch CR which operates automatically to break a circuit and thereby to turn the grinding wheel 14 immediately to a rearward or inoperative position.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a transversely movable slide, means rotatably to support a grinding wheel on said slide, means including a piston and cylinder automatically to feed said slide transversely toward and from a work piece to grind the same, a work support including a rotatable work supporting turret to support a plurality of work pieces, an index mechanism to index said turret successively to position a plurality of work pieces in an operative position, and means including a piston and cylinder successively to clamp said work pieces in an operative position on said turret during grinding operation.

2. In a grinding machine having a transversely movable slide, means rotatably to support a grinding wheel thereon, means including a piston and cylinder to feed said grinding wheel slide transversely toward and from a work piece, a work support including a rotatable work supporting turret to support a plurality of work pieces, locating means on said turret to support and locate a plurality of work pieces in fixed positions on said turret hydraulically operated means including a piston and cylinder to clamp a work piece on said turret during a grinding operation, and an indexing mechanism including a piston and cylinder actuated pawl to index said turret successively to present work pieces into an operative position.

3. In a grinding machine having a transversely movable slide, means rotatably to support a grinding wheel thereon, means including a piston and cylinder to feed said grinding wheel slide transversely toward and from a work piece, a solenoid actuated control valve therefor, a work support including a rotatable work supporting turret to support a plurality of work pieces, a hydraulically operated means including a piston and cylinder to clamp a work piece on said turret during a grinding operation, an index mechanism including a piston and cylinder actuated pawl to index said turret successively to present work pieces into an operative position, and a solenoid actuated control valve to control the admission to and exhaust of fluid from said work clamping and said turret indexing cylinders.

4. In a grinding machine having a transversely movable slide, means rotatably to support a grinding wheel thereon, means including a piston and cylinder to feed said grinding wheel slide transversely toward and from a work piece, a solenoid actuated control valve therefor, a work support including a rotatable work supporting turret to support a plurality of work pieces, a hydraulically operated means including a piston and cylinder to clamp a work piece on said turret during a grinding operation, an index mechanism including a piston and cylinder actuated pawl to index said turret successively to present work pieces into an operative position, a solenoid actuated control valve to control the admission to and exhaust of fluid from said work clamping and said turret indexing cylinders, and means including a limit switch actuated by rearward movement of the wheel slide to energize the first solenoid valve so as to start a grinding cycle.

5. In a grinding machine having a transversely movable slide, means rotatably to support a grinding wheel thereon, means including a piston and cylinder to feed said slide transversely toward and from a work piece, a work support including a rotatable work supporting turret to support a plurality of work pieces, hydraulically operated means including a piston and cylinder to clamp a work piece on said turret during a grinding operation, an index mechanism to index successively work pieces into operative positions including a pawl and ratchet means, a spring to actuate said pawl through an idle stroke, means including a piston and cylinder to actuate said pawl through an indexing stroke and means actuated automatically in timed relation with the rearward movement of the wheel slide to admit fluid under pressure to said index cylinder to index the work turret.

6. In a grinding machine having a base, a transversely movable slide thereon, means rotatably to support a grinding wheel on said slide, means including a piston and cylinder to feed said slide transversely in either direction, a work support including a rotatable work supporting turret successively to convey a plurality of work pieces to and from an operative position, means on said turret precisely to locate a plurality of work pieces thereon, an indexing mechanism including a pawl and ratchet to index said turret, a spring actuated means to move said pawl through its idle stroke, and a piston and cylinder to actuate said pawl through an operative stroke.

7. In a grinding machine having a base, a transversely movable slide thereon, means rotatably to support a grinding wheel on said slide, means to feed said slide in either direction, a work support including a rotatable turret successively to convey a plurality of work pieces to and from an operative position, a plurality of locating and supporting devices on said turret precisely to locate a plurality of work pieces in substantially radial position on said turret, an indexing mechanism including a pawl and ratchet to index said turret, a piston and cylinder to actuate the pawl through an indexing stroke, means including a solenoid valve to control the flow of fluid to and from said cylinder means including a limit switch actuated in timed relation with the movement of the wheel slide toward an inoperative position to initiate the next grinding cycle, and means including a limit switch which is actuated by said wheel slide during its rearward movement to actuate said solenoid valve and thereby to index said turret.

8. In a grinding machine as claimed in claim 3 in combination with the parts and features therein specified of means including a starter switch to energize the wheel feed solenoid valve to initiate an infeeding movement of the grinding wheel, means including a limit switch actuated by the infeeding of the grinding wheel to actuate a second solenoid valve to admit fluid under pressure to the work clamping cylinder so as to clamp a work piece in an operative position on said turret during a grinding operation, a second limit switch which is actuated when the grinding wheel approaches its forward position to actuate the wheel feed solenoid valve so as to cause the grinding wheel to move rearwardly to a nonoperative position, said rearward movement of the grinding wheel serves to actuate said first limit switch to actuate the second solenoid valve so as to unclamp the ground work piece and thereafter to index the work turret to present the next work piece in an operative grinding position.

9. In a grinding machine as claimed in claim 3 in combination with the parts and features therein specified of means including a starter switch to energize the wheel feed solenoid valve to initiate an infeeding movement of the grinding wheel, means including a limit switch closed by the infeeding of the grinding wheel to energize a second solenoid valve to admit fluid under pressure to the work clamping cylinder so as to clamp a work piece in an operative position on said turret during a grinding operation, a second limit switch which is opened when the grinding wheel approaches its forward position to de-energize the wheel feed solenoid valve so as to cause the grinding wheel to move rearwardly to a non-operative position, said rearward movement of the grinding wheel serves to open said first limit switch to de-energize the second solenoid valve so as to unclamp the ground work piece and thereafter to index the work turret to present the next work piece in an operative grinding position.

10. In a grinding machine as claimed in claim 3 in combination with the parts and features therein specified of means including a starter switch to actuate the wheel feed solenoid valve to initiate an infeeding movement of the wheel slide, means including a limit switch which is actuated by the infeeding movement of said slide to actuate a second solenoid valve so as to admit fluid under pressure to said work clamp cylinder to clamp a work piece in an operative position on said turret during a grinding operation, and a second limit switch which is actuated by said slide when the slide reaches its forward position to actuate the wheel feed solenoid valve so as to cause a rearward movement of the wheel slide to an inoperative position, the rearward movement of the wheel slide actuates said first limit switch to actuate the second solenoid valve to allow fluid to exhaust from the work clamp cylinder so as to unclamp the ground work piece and to admit fluid under pressure to the index cylinder so as to index the work turret to present the next work piece in an operative grinding position.

11. In a grinding machine as claimed in claim 3 in combination with the parts and features therein specified of means including a starter switch to energize the wheel feed solenoid valve to initiate an infeeding movement of the wheel slide, means including a limit switch which is closed by the infeeding movement of said slide to energize a second solenoid valve so as to admit fluid under pressure to said work clamp cylinder to clamp a work piece in an operative position on said turret during a grinding operation, and a second limit switch which is opened by said slide when the slide reaches its forward position to de-energize the wheel feed solenoid valve so as to cause a rearward movement of the wheel slide to an inoperative position, the rearward movement of the wheel slide opens said first limit switch to de-energize the second solenoid valve to allow fluid to exhaust from the work clamp cylinder so as to unclamp the ground work piece and to admit fluid under pressure to the index cylinder so as to index the work turret to present the next work piece in an operative grinding position.

12. In a grinding machine as claimed in claim 3 in combination with the parts and features therein specified of means including a starter switch to actuate the wheel feed solenoid valve to initiate an infeeding movement of the grinding wheel, means including a limit switch which is actuated by the infeeding movement of said slide to actuate a second solenoid valve so as to admit fluid under pressure to said work clamp cylinder to clamp a work piece in an operative position on said turret during a grinding operation, a second limit switch which is actuated by said slide when the slide reaches its forward position to actuate the wheel feed solenoid valve so as to cause a rearward movement of the wheel slide to an inoperative position, the rearward movement of the wheel slide actuates said first limit switch to actuate the second solenoid valve to allow fluid to exhaust from the work clamp cylinder so as to unclamp the ground work piece and thereafter to admit fluid under pressure to the index cylinder so as to index the work turret to present the next work piece in an operative grinding position, said rearward movement of the wheel slide serves to actuate the second limit switch to again actuate the wheel feed solenoid valve automatically to initiate the next grinding cycle.

13. In a grinding machine as claimed in claim 3 in combination with the parts and features therein specified of means including a starter switch to energize the wheel feed solenoid valve to initiate an infeeding movement of the grinding wheel, means including a limit switch which is closed by the infeeding movement of said slide to energize a second solenoid valve so as to admit fluid under pressure to said work clamp cylinder to clamp a work piece in an operative position on said turret during a grinding operation, a second limit switch which is opened by said slide when the slide reaches its forward position to de-energize the wheel feed solenoid valve so as to cause a rearward movement of the wheel slide to an inoperative position, the rearward movement of the wheel slide opens said first limit switch to de-energize the second solenoid valve to allow fluid to exhaust from the work clamp cylinder so as to unclamp the ground work piece and thereafter to admit fluid under pressure to the index cylinder so as to index the work turret to present the next work piece in an operative grinding position, said rearward movement of the wheel slide serves to close the second limit switch to again energize the wheel feed solenoid valve automatically to initiate the next grinding cycle.

JOHN I. GARSIDE.

REFERENCES CITED

The following references are of record in the file of this patent:

UNITED STATES PATENTS

| Number | Name | Date |
| --- | --- | --- |
| 1,017,881 | Landis | Feb. 20, 1912 |
| 1,837,319 | Fraser | Dec. 22, 1931 |
| 1,891,657 | Theler | Dec. 20, 1932 |
| 1,989,517 | Holmes | Jan. 29, 1935 |
| 2,003,269 | Arter et al. | May 28, 1935 |
| 2,229,312 | Silven et al. | Jan. 21, 1941 |
| 2,270,590 | Johnson | Jan. 20, 1942 |